Patented July 16, 1946

2,404,235

UNITED STATES PATENT OFFICE 2,404,235

UNSATURATED ORGANIC COMPOUNDS

Morris S. Kharasch, Chicago, Ill., assignor to Eli Lilly and Company, Indianapolis, Ind., a corporation of Indiana No Drawing. Application March 25, 1944, Serial No. 528,176

5 Claims. (Cl. 260—669)

This invention relates to the production of unsaturated organic compounds and more particularly to methods for producing compounds having an alkylene linkage.

Organic compounds having an alkylene linkage are used for a wide variety of purposes and are employed as intermediates in many chemical processes. Styrene, for example, is useful as an electrical insulator and finds wide application in the production of many synthetic compositions, such as certain types of plastics.

In accordance with this invention, organic compounds having an alkylene linkage are produced by reacting a vinyl halide as defined below with an aromatic or aryl-aliphatic Grignard's reagent in the presence of a halide of cobalt, nickel, iron or chromium. The vinyl halide may be any vinyl halide or substituted-vinyl halide of the following formula:

$$\begin{array}{c} R_1 \quad R_3 \\ | \quad \quad | \\ C = C \\ | \quad \quad | \\ R_2 \quad Y \end{array}$$

in which Y is a halogen, $R_1$ is selected from the class consisting of hydrogen, lower alkyl radicals, and aromatic radicals, and $R_2$ and $R_3$ are selected from the class consisting of hydrogen and lower alkyl radicals but are both hydrogen when $R_1$ is aromatic. Desirably, the metallic halide does not exceed 15 mole percent of the Grignard's reagent used, and preferably the amount of metallic halide employed is about 5 mole percent of the Grignard's reagent used. The reaction which takes place may be represented by the following equation:

$$RMgX + \begin{array}{c} R_1 \quad R_3 \\ | \quad \quad | \\ C = C \\ | \quad \quad | \\ R_2 \quad Y \end{array} \xrightarrow{\text{metallic halide}} \begin{array}{c} R_1 \quad R_3 \\ | \quad \quad | \\ C = C \\ | \quad \quad | \\ R_2 \quad R \end{array} + MgXY$$

in which X is a halogen; R is an aryl radical, such as phenyl or naphthyl, or an aryl-aliphatic radical such as the benzyl; and Y, $R_1$, $R_2$, and $R_3$ have the same meaning as before.

Markedly greater yields are effected when the unsaturated carbon atom of the substituted vinyl halide carrying the halogen atom also carries a hydrogen atom, rather than an alkyl radical.

In the method in accordance with this invention, the Grignard's reagent is desirably reacted with the metallic halide, and the resulting reaction product in turn reacted with the vinyl halide or substituted vinyl halide. The Grignard's reagent is preferably dissolved in an inert and anhydrous solvent, such as ethylether.

The solution of the Grignard's reagent is cooled in a bath to a temperature of approximately —20° to —10° C.; and, while vigorously agitating the solution, adding the metallic halide of cobalt, nickel, iron or chromium to the reaction product. The reaction product is formed within a relatively short period of time. To the reaction product is added over a period of one-half to one hour, in small portions, the vinyl halide or substituted vinyl halide. The reaction mixture during the addition may be maintained at low temperature (—10° to —20° C.) or gradually permitted to rise toward room temperature (15° to 20° C.). It is preferred to add the vinyl halide or substituted vinyl halide $$\left( \text{i. e. } C_6H_5-\overset{H}{\underset{|}{C}}=\overset{H}{\underset{|}{C}}-Br \right)$$

to the reaction product of the Grignard's reagent and the metallic halide, rather than to add the reaction product to the vinyl halide or substituted vinyl halide. After the vinyl halide or substituted vinyl halide has been added, the reaction mixture is permitted to rise to room temperature; and the reaction mixture is agitated for several hours. Decomposition of the reaction mixture is effected by pouring the mixture into ice and a non-oxidizing acid, such as hydrochloric acid. The desired organic compound containing the alkylene linkage may be separated from the other components of the reaction mixture by any convenient means. The reaction mixture separates into two layers, an organic solvent layer and a water solution. The organic solvent layer contains substantially all of the desired organic compound having the alkylene linkage in the mixture. It may be recovered from the organic solvent layer by any suitable means, such as distillation of the solvent.

Typical examples of the invention are given below.

In all of the typical examples, the Grignard's reagents were prepared in a three neck flask equipped with a reflux condenser, a mercury-sealed stirrer and a dropping funnel. The reactions were carried out in all-glass apparatus. Before the apparatus was used, it was dried by heating with a flame and freed from oxygen by a stream of nitrogen. All the halides for the preparation of Grignard's reagents were freshly distilled. An excess of about 5% of carefully dried magnesium turnings was used. The solvent was ethyl ether. Where the Grignard compound (e. g. α-naphthylmagnesium bromide) was not sufficiently soluble in ethyl ether, dry thiophene free benzene was added to the solution in order to increase the solubility. The normalities of the various Grignard's solutions varied from 0.5 to 2.3.

The concentrations of these Grignard's solutions were determined by decomposing 2 or 5 ml. samples with an excess of standard acid, and titrating the excess of the acid. Phenolphthalein was used as an indicator. The amount of ionized halogen in the Grignard's solution was determined by decomposing a measured sample with an excess of dilute nitric acid, and titrating the mixture according to the Volhard method. In drawing the sample for the Volhard titration, the use of a dry pipette previously filled with nitrogen greatly increased the accuracy of the determination.

The anhydrous metal halides, used as catalysts, were prepared from their hydrates by dehydration in a stream of dry hydrogen halide gas. For example, the metallic chlorides were produced from their hydrates by dehydration in a stream of hydrogen chloride gas. They were finally dried in vacuo at 200° C.

In all of the examples the reaction with the vinyl halides or substituted vinyl halides were conducted in the following manner. The 500 ml. three-necked flask used was similar to the one used for preparing the Grignard's compounds, but was provided with a graduated dropping funnel of 100 ml. capacity. The upper end of the reflux condenser was connected through a calcium chloride drying tube to a trap. This trap was cooled with a dry ice-alcohol mixture to collect any low boiling material which might be formed. The outlet of the trap was connected through a drying tube with a bubbler to indicate the evolution of any gas not condensed in the trap. The three-neck flask was provided with an inlet tube reaching to its bottom, for the introduction of gaseous vinyl halide. The flask, after being filled with dry nitrogen, was surrounded by a bath of crushed ice. A measured amount of Grignard's solution was added through the dropping funnel. The dropping funnel was then removed, a weighed amount (e. g. 5 mole percent of the Grignard compound used) of metal halide added to the contents of the flask, and the dropping funnel immediately replaced. The mixture was stirred until the development of the black or dark color which indicates a reaction between the Grignard's compound and the metallic halide. To the reaction mixture, which was constantly stirred and cooled, an excess of dry gaseous vinyl halide or substituted vinyl halide was then added. The vinyl halide or substituted vinyl halide was dispensed from a calibrated test tube in which it had been liquefied. Before entering the reaction flask it passed through a calcium chloride drying tube. The rate of addition was adjusted to keep the reaction from becoming too vigorous. Approximately twice the theoretical amount of vinyl halide or substituted vinyl halide was used. A reaction between the components was noticeable when only a fraction of the vinyl halide had been added. After the addition of all the vinyl halide or substituted vinyl halide, the mixture was allowed to stand at room temperature for 12 hours. It was then heated for 30 minutes, again cooled, and finally poured into a mixture of 100 g. ice and 200 ml. distilled water. Glacial acetic acid (10 ml.) and ethyl ether (about 100 ml.) were then added. The ether and water layers were separated, and the water layer extracted twice with ether. The combined ethereal extracts were then washed with a 5% sodium bicarbonate solution to remove all acetic acid. The bicarbonate solution was added to the water layer; the aqueous solutions were combined, filtered, and made up to 1000 ml. From this solution, aliquots were withdrawn for halogen ion determination. The total halogen ion found, minus the halogen ion corresponding to the amount of Grignard's compound and the metallic halide used, indicated how much vinyl halide had reacted. The residue left after distilling the ether from the ether extract was steam distilled. The oily fraction of the distillate was separated from the crystalline fraction. All distilled fractions, as well as the non-distillable residue, were quantitatively collected, dried and weighed. The liquid fraction of the steam distillate was extracted twice with ether, the ether solution dried with sodium sulfate, and the reaction product isolated by fractional distillation. The organic compound with the alkylene linkage was identified by its physical constants and/or by converting it into some well defined derivative, such as the dibromide. All crystalline substances were identified by their melting points and the melting points of mixtures made with pure materials.

When higher boiling substituted vinyl halides (e. g. 2-bromopropene-1 or 1-bromopropene-1) were used, the liquid halide was diluted with an equal volume of dry ether and the solution run into the reaction flask through the dropping funnel. Otherwise, the method of experimentation was identical with the one already described.

The typical examples above referred to are as follows:

*Example 1.—Preparation of 1-phenylpropene-1 and 2-phenylpropene-1*

Phenyl magnesium bromide is the aromatic Grignard's reagent employed in the preparation of 1-phenylpropene-1 and 2-phenylpropene-1. To prepare the phenyl magnesium bromide, 53 g. of magnesium was covered with 400 ml. of dry ethyl ether; 315 g. bromobenzene (dissolved in 600 ml. ether) was then added at a rate such that, after formation of the Grignard's reagent had started, the reaction mixture was kept gently refluxing. After the addition was complete, the mixture was refluxed for another two hours and left to stand for at least six hours more. By this time, most of the dispersed solid material had settled. The solution was then syphoned through a carefully dried, fritted glass funnel into a dark glass bottle. The speed of the filtration, which was performed under nitrogen, was easily controlled by regulating the nitrogen pressure. When these precautions were observed water-clear Grignard's solutions were obtained.

The substituted vinyl halides employed in the preparation of 1-phenylpropene-1 and 2-phenylpropene-1 are 1-bromopropene-1 and 2-bromopropene-1. A mixture of these bromopropenes was produced from propylene dibromide by the action of one mole of sodium ethylate on one mole of propylene dibromide. The compounds were then separated by fractional distillation through a Podbielniak column of 100 plates. For the example with 2-bromopropene-1, the fraction boiling from 47° to 49° C. (cor.) was used. For the example with 1-bromopropene-1 the fraction used (a mixture of the cis and trans isomers) had a boiling range from 59° to 63° (cor.).

A quantity of phenylmagnesium bromide prepared as above outlined was added through the dropping funnel in the 5 ml. flask as heretofore described. The dropping funnel was then removed, about 5 mole percent of anhydrous cobalt chloride, based on the quantity of phenylmagnesium bromide used, was added to the contents of the flask and the dropping funnel immediately replaced. The mixture was agitated until the development of a black or dark color. To this mixture, which is constantly stirred and cooled, was added slowly about twice the theoretical amount of 1-bromopropene-1 necessary to combine with the phenyl-magnesium bromide in the flask to form 1-phenylpropene-1. After the addition of all of the 1-bromopropene-1, the mixture was allowed to stand at room temperature for about 12 hours. It was then heated for about 30 minutes, cooled and poured into a mixture of 100 grams of ice and 200 ml. of distilled water. Glacial acetic acid and ethylether were added and the 1-phenylpropene-1 obtained from the ether layer as heretofore described. The resulting 1-phenylpropene-1 which consists of the trans and cis forms has a dibromide melting at 66–67° C.

The 2-phenylpropene-1 was prepared in the same manner as the 1-phenylpropene-1, except that 2-bromopropene-1 was employed instead of 1-bromopropene-1.

*Example 2.—Preparation of styrene*

Styrene was prepared in the same manner as 1-phenylpropene-1 described in Example 1, except that an equivalent amount of vinyl bromide or vinyl chloride was used instead of 1-bromopropene-1. When cobalt chloride was employed, the yield of styrene was about 56%. When chromic chloride was employed, the yield was about 38%. When vinyl chloride was used instead of vinyl bromide with cobalt chloride as the metallic halide, the yield is about 56%.

*Example 3.—Preparation of 3-phenylpropene-1*

3-phenylpropene-1 was prepared in the same manner as 1-phenylpropene-1 described in Example 1, except that instead of using phenylmagnesium bromide, benzyl magnesium bromide was employed, and instead of using 1-bromopropene-1, an equivalent amount of vinyl bromide was used. When cobalt chloride was used as the metallic halide, the yield of the 3-phenylpropene-1 was about 75% based upon the Grignard's reagent employed.

*Example 4.—Preparation of α-naphthylethylene*

α-Naphthylethylene was prepared in the same manner as 1-phenylpropene-1, except that instead of employing phenylmagnesium bromide, α-naphthylmagnesiumbromide was used; and instead of using 1-bromopropene-1, an equivalent amount of vinyl bromide was employed. The yield of the resulting α-naphthylethylene based upon the Grignard's reagent employed was about 61%.

*Example 5.—Preparation of unsymmetrical stilbenes*

If phenylmagnesium bromide is allowed to react with α-bromostyrene

in the presence of cobaltous chloride in accordance with the instructions given in Example 1, stilbene

is the reaction product. However, if instead of phenylmagnesium bromide, tolylmagnesium bromide, p-chlorophenylmagnesium bromide, or p-methoxyphenyl-magnesium bromide are treated with bromostyrene in the presence of cobaltous chloride, the corresponding substituted unsymmetrical stilbenes are formed.

*Example 6*

The results described in Example 5 can be duplicated using instead of cobaltous chloride, the other catalyst ($NiCl_2$ $CrCl_3$, $FeCl_2$). Of the entire group, iron chloride is perhaps the least desirable.

What is claimed is:

1. The method of producing an organic compound having an alkylene linkage which comprises reacting with a vinyl halide of the formula:

in which Y is a halogen, $R_1$ is selected from the class consisting of hydrogen, lower alkyl radicals, and aromatic radicals, and $R_2$ and $R_3$ are selected from the class consisting of hydrogen and lower alkyl radicals but are both hydrogen when $R_1$ is aromatic, the reaction product of a metallic halide selected from the class which consists of the halides of cobalt, nickel, iron and chromium with a Grignard's agent having the formula RMgX in which X is a halogen and R is a radical having a carbon atom directly attached to the magnesium atom of the reagent and selected from the class which consists of aryl radicals and aryl-aliphatic radicals.

2. The method of producing an organic compound having an alkylene linkage which comprises reacting in the presence of a metallic halide selected from the class which consists of the halides of cobalt, nickel, iron and chromium, a vinyl halide of the formula:

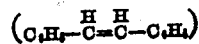

in which Y is a halogen, $R_1$ is selected from the class consisting of hydrogen, lower alkyl radicals, and aromatic radicals, and $R_2$ and $R_3$ are selected from the class consisting of hydrogen and lower alkyl radicals but are both hydrogen when $R_1$ is aromatic, with a Grignard's reagent having the formula RMgX in which X is a halogen and R is a radical having a carbon atom directly attached to the magnesium atom of the reagent and selected from the class which consists of aryl radicals and aryl-aliphatic radicals.

3. The method of producing an organic compound having an alkylene linkage in accordance with claim 2, in which the vinyl halide has a hydrogen atom attached to the unsaturated carbon atom to which the halogen atom is attached.

4. The method of producing styrene which comprises reacting a vinyl halide with a reaction product of a phenylmagnesium halide and a metallic halide selected from the group which consists of the halides of cobalt, nickel, iron and chromium.

5. The method of producing styrene in accordance with claim 4, in which the metallic halide is a halide of cobalt.

MORRIS S. KHARASCH.